(12) United States Patent
Shaked et al.

(10) Patent No.: US 7,756,748 B2
(45) Date of Patent: Jul. 13, 2010

(54) APPLICATION OF AUTOMATIC INTERNET IDENTIFICATION METHODS

(75) Inventors: Shvat Shaked, Jerusalem (IL); Or Tal, Tel Aviv (IL); Yuval Tarsi, Kfar Saba (IL); Saar Wilf, Jerusalem (IL)

(73) Assignee: Trivnet Ltd., Shefayim (IL)

( * ) Notice: Subject to any disclaimer, the term of this patent is extended or adjusted under 35 U.S.C. 154(b) by 2818 days.

(21) Appl. No.: 09/772,951

(22) Filed: Jan. 31, 2001

(65) Prior Publication Data

US 2001/0034718 A1    Oct. 25, 2001

Related U.S. Application Data

(60) Provisional application No. 60/179,017, filed on Jan. 31, 2000, provisional application No. 60/197,002, filed on Apr. 13, 2000, provisional application No. 60/220,498, filed on Jul. 25, 2000.

(51) Int. Cl.
    *G06Q 40/00* (2006.01)
(52) U.S. Cl. .......................................... 705/26; 705/35
(58) Field of Classification Search ................... 705/26, 705/35
    See application file for complete search history.

(56) References Cited

U.S. PATENT DOCUMENTS

| 4,405,829 | A | | 9/1983 | Rivest et al. |
| 4,602,120 | A | * | 7/1986 | Wakefield et al. ........... 136/256 |
| 4,625,081 | A | * | 11/1986 | Lotito et al. ............. 379/88.26 |
| 5,265,033 | A | | 11/1993 | Vajk et al. |
| 5,335,278 | A | | 8/1994 | Matchett et al. |
| 5,477,262 | A | * | 12/1995 | Banker et al. .................. 725/38 |
| 5,867,495 | A | * | 2/1999 | Elliott et al. ................. 370/352 |
| 5,923,756 | A | | 7/1999 | Shambroom |
| 5,949,875 | A | * | 9/1999 | Walker et al. .................. 702/78 |
| 6,032,133 | A | * | 2/2000 | Hilt et al. ....................... 705/40 |
| 6,052,785 | A | | 4/2000 | Lin et al. |
| 6,061,650 | A | | 5/2000 | Malkin et al. |
| 6,108,540 | A | * | 8/2000 | Sonti et al. ................... 455/433 |
| 6,215,858 | B1 | * | 4/2001 | Bartholomew et al. ... 379/88.17 |
| 6,219,790 | B1 | | 4/2001 | Lloyd et al. |
| 6,256,739 | B1 | | 7/2001 | Skopp et al. |
| 6,571,290 | B2 | * | 5/2003 | Selgas et al. ................. 709/228 |
| 6,731,625 | B1 | * | 5/2004 | Eastep et al. ................. 370/352 |
| 6,763,468 | B2 | * | 7/2004 | Gupta et al. ................. 713/201 |
| 6,779,113 | B1 | * | 8/2004 | Guthery ....................... 713/172 |
| 6,795,429 | B1 | * | 9/2004 | Schuster et al. ............. 370/352 |

FOREIGN PATENT DOCUMENTS

WO    WO 00/49586    8/2000

OTHER PUBLICATIONS

U.S. Appl. No. 09/772,950, Shaked et al., filed Jan. 31, 2001.

(Continued)

*Primary Examiner*—Thu Thao Havan
(74) *Attorney, Agent, or Firm*—Troutman Sanders LLP; Ryan A. Schneider; Trenton A. Ward

(57) ABSTRACT

A method of controlling access to a service over a network, including the steps of automatically identifying a service user and acquiring user information, thereby to control the access. Additionally, a method of providing service over a network, in which the service requires identification of a user, including the steps of automatically identifying the user; and associating the user with user information, thus enabling the service.

14 Claims, 8 Drawing Sheets

OTHER PUBLICATIONS

U.S. Appl. No. 60/179,017, Shaked et al., filed Jan. 31, 2000.
U.S. Appl. No. 60/197,002, Shaked et al., filed Apr. 13, 2000.
U.S. Appl. No. 60/220,498, Wilf et al., filed Jul. 25, 2000.

Secure Electronic Transaction http:///www.visa.com/set.
PCT Written Opinion, Jun. 11, 2003.

* cited by examiner

| STAGE | SOURCE | DESTINATION | MEDIUM | CONTENT |
|---|---|---|---|---|
| 1 | USER | MERCHANT | INTERNET | REQUEST PRODUCT |
| 2 | MERCHANT | IDENTIFICATION SYSTEM | SECURE CONNECTION | IDENTIFICATION REQUEST |
| 3 | IDENTIFICATION SYSTEM | ID SWITCHING MODULE | SECURE CONNECTION | USER ID + CREDIT CARD NUMBER |
| 4 | IDENTIFICATION SYSTEM | MERCHANT | SECURE CONNECTION | USER ID |
| 5 | MERCHANT | ID SWITCHING MODULE | INTERCHANGE NETWORK | TRANSACTION DETAILS + USER ID |
| 6 | ID SWITCHING MODULE | ISSUING BANK | INTERCHANGE NETWORK | TRANSACTION DETAILS + CREDIT CARD NUMBER |

FIG.6

APPLICATION OF AUTOMATIC INTERNET IDENTIFICATION METHODS

CROSS REFERENCE TO RELATED APPLICATIONS

This application claims the priority of U.S. Provisional Patent Application 60/179,017, filed 31 Jan. 2000 and entitled "System And Method For Conducting Credit Card Transactions Over An Insecure Network", U.S. Provisional Patent Application 60/197,002, filed 13 Apr. 2000 and entitled "System And Method For Conducting Credit Card Transactions Over An Insecure Network", and U.S. Provisional Patent Application 60/220,498, filed 25 Jul. 2000 and entitled "Applications Of Automatic Identification", all of which are incorporated in their entirety herein by reference.

FIELD OF THE INVENTION

The present invention relates to applications that use automatic anonymous network user identification systems.

BACKGROUND OF THE INVENTION

Many services require real-world information about a user. Identifying a user and acquiring real-world information about him is herein defined as "user identification". Such information includes, for example, first name, last name, full home address, telephone numbers for home and work, fax and mobile, and credit card information. This is true whether the service is obtained in person or over a network.

One type of service requiring user identification is a credit card purchase. In order to complete a purchase, the user must provide credit card information that will enable a retailer to process a credit card transaction in some cases, service providers enhance their services by using user identification information. For example, a chain-store delivery service can use the zip code of a user to direct an order to the closest branch.

The Internet is one type of a network, and it is used extensively today for providing a wide array of services and communications. It is, however, an anonymous medium, as it does not require its participants to identify themselves. The Internet provides many services that do not require such identification. For example, in a standard HTTP Internet session a user may access a server and view information without the server being notified of the identity of the user. In another example, users may participate in a "chat" session in which they exchange text messages without identifying themselves.

While the anonymous nature of the Internet is convenient for most users in most situations, it presents a significant barrier in services involving private or confidential information, financial applications, or any other service vulnerable to fraud or abuse Similar problems are present in other networks, such as the cellular and mobile networks.

Many methods have been offered to solve this problem. In the case of the Internet, the user is sometimes issued a software or hardware identity token by a trusted authority. This token is then verified over the Internet using cryptographic methods such as the Rivest, Shamir, Adleman algorithm (RSA algorithm) (U.S. Pat. No. 4,405,829 Cryptographic Communications System And Method). These methods are limited in that a user wishing to obtain such a token must go through a cumbersome off-line identification process with the trusted authority. In many cases, there is also some installation that requiring technical ability that is necessary before the system can be used. An example is a smart card, which is a physical package that stores the user id internally in such a manner that it cannot be changed.

Due to such problems, service providers on a network often ask users to voluntarily provide their identification information. For example, when purchasing items over a network, a user will usually manually provide his credit card account number by filling in an HTML form or by entering data on his cellular or mobile phone. This identification method is insecure, since by obtaining the credit card number, any person can impersonate the original cardholder.

There are a number of issues that arise when a user manually provides such identification information. These include data entry errors, purposeful entry of fraudulent information, and reluctance on the part of users to provide this information over a network. The user's reluctance may be caused by lack of trust in the service provider if, for example, it is an unfamiliar service provider. It may also be caused by privacy concerns on the part of the user that his personal information may be accessed improperly. The current rates of Internet credit card fraud are an indication of current Internet commerce problems

SUMMARY OF THE INVENTION

There is provided, in accordance with an embodiment of the present invention, a method of controlling access to a service over a network. The method includes the steps of automatically identifying a service user and acquiring user information, thereby to control the access.

Moreover, in accordance with an embodiment of the present invention, the network is an anonymous network.

Further, in accordance with an embodiment of the present invention, the network is any one of the group including a data network, a cellular data network, and the Internet.

Still further, in accordance with an embodiment of the present invention, the user information is "real-world" information.

Additionally, in accordance with an embodiment of the present invention, the controlling is allowing or denying access.

Moreover, in accordance with an embodiment of the present invention, the service is any one of the group including e-mail service, electronic banking, financial service, and firewall.

Further, in accordance with an embodiment of the present invention, the method may include the step of sending the user information to a service provider.

Still further, in accordance with an embodiment of the present invention, the method may include the step of associating the user information with control information.

In addition, in accordance with an embodiment of the present invention, the step of associating is performed by a service provider.

Additionally, in accordance with an embodiment of the present invention the method may include the step of requesting information from the user.

There is also provided, in accordance with another preferred embodiment of the present invention, a method of providing service over a network, in which the service requires identification of a user. The method includes the steps of automatically identifying the user and associating the user with user information, thus enabling the service.

Moreover, in accordance with an embodiment of the present invention, the user is a service user.

Further, in accordance with an embodiment of the present invention, the service is any one of the group including caller identification, call management, financial transactions, and restricted services.

Still further, in accordance with an embodiment of the present invention, the method of providing financial transactions service may include the step of automatically providing user billing details.

Moreover, in accordance with an embodiment of the present invention, the method of providing financial transactions service may include the step of sending the user information to a merchant. The user information may be a temporary user identification.

Further, in accordance with an embodiment of the present invention, the method of providing financial transactions service may include the step of associating the user information with billing information.

BRIEF DESCRIPTION OF THE DRAWINGS

The present invention will be understood and appreciated more fully from the following detailed description taken in conjunction with the appended drawings in which:

FIG. 6 is a tabular illustration of the requirements of a system for managing a user account over an insecure network in accordance with an embodiment of the present invention;

DETAILED DESCRIPTION OF THE INVENTION

Applicants have realized that creation of automatic and secure systems (or methods) for identification of users on an anonymous network allows the expansion of services for such a network. Examples of such services for an anonymous network are described hereinbelow and include access control, adult verification systems, caller identification, "call waiting", user account management, and fraud prevention management.

Such systems may operate automatically, without user intervention, to accurately identify a user on an anonymous network and be able to provide and/or validate "real world" information about the user. Some applications may further require a system that authenticates user identification and/or user real world data without sending this information over the anonymous network.

An example of such a system and method is described in U.S. Patent Application "Automatic Network User Identification", filed on the same day as the present U.S. Patent Application, and assigned to the common assignee of the present invention. U.S. Patent Application, "Automatic Network User Identification", is incorporated herein by reference. It is noted, however, that any suitable identification system may be used; the above-mentioned patent is one example of a suitable system.

Figure 1:
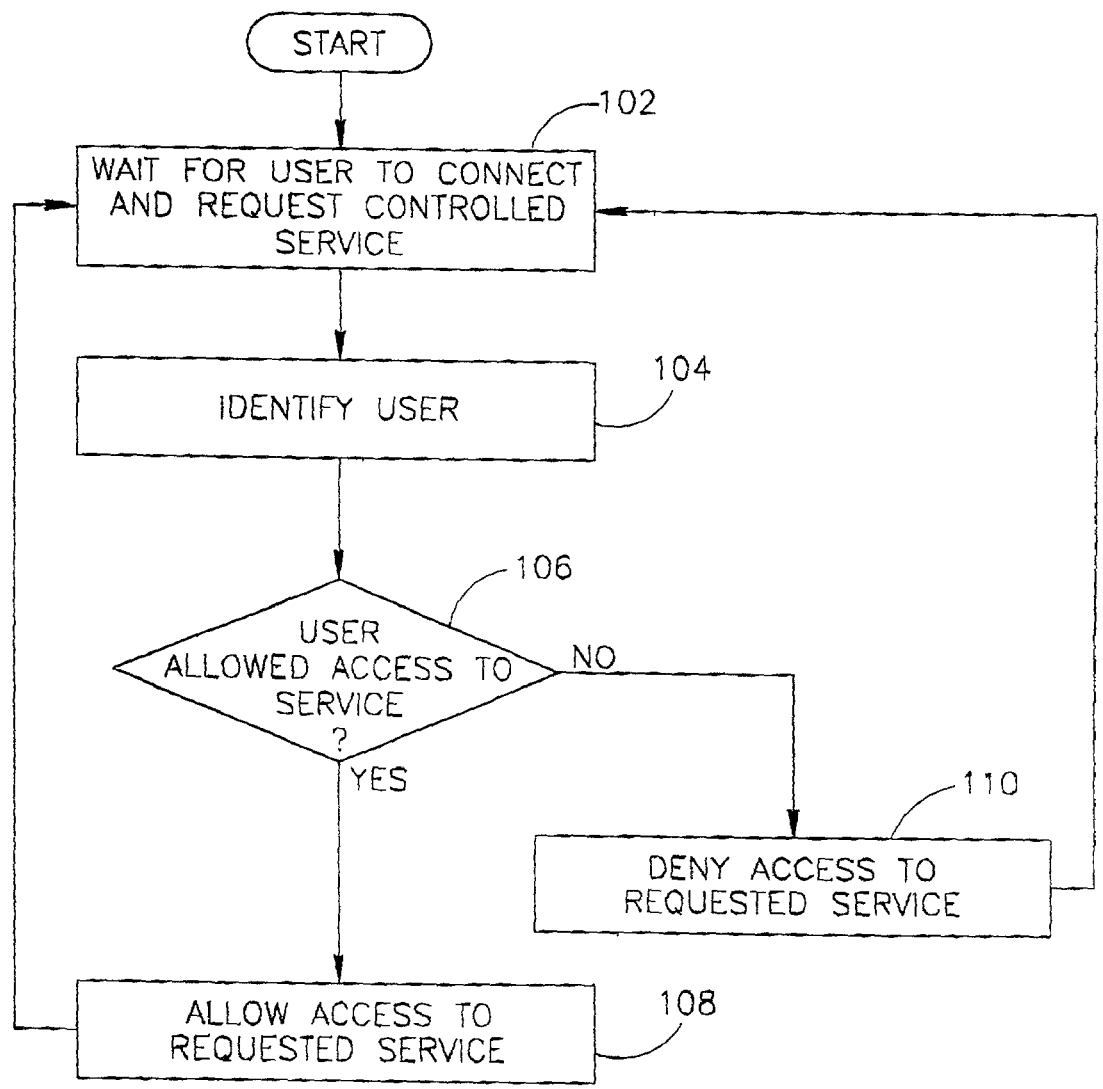
FIG. 1 is a schematic flow chart illustration of a method for controlling access to an anonymous network service by using automatic identification. operative in accordance with an embodiment of the present invention.

Reference is now made to FIG. 1, a schematic flow chart diagram of a method for controlling access to an anonymous network service by using automatic identification, in accordance with an embodiment of the present invention. The access system waits for a user to connect and to request a restricted access service (step 102). The user is then identified in accordance with an identification method, for example that described in U.S. Patent Application "Automatic Network User Identification" (step 104). The permissions of the user are checked to see if the user is allowed access to the service (step 106), and he is allowed access (step 108) or denied access (step 110) to the requested service accordingly. The access system then resumes its wait for the next user request (step 102).

As mentioned hereinabove and further described in detail in U.S. Patent Application "Automatic Network User Identification", the step of identification may not reveal actual user information. Instead, what may be sent is a unique user ID, unrelated to any "real world" user ID, that the service provider uses to assign and check permissions of users. In a further embodiment of the present invention, user permissions may be kept in an identification system, in which case the service provider may be notified only whether or not the user is allowed access.

The method and system of FIG. 1 can be used to control access to a variety of applications. In an embodiment of the present invention, the method may be used to control access to network resources using a firewall. A network administrator defines in the firewall the telephone numbers and/or network login names of users from network access providers (NAP) as being permitted to access certain network resources.

When an unknown user tries to access these resources, the firewall queries an identification system for the telephone number and/or login name of the user. If these parameters match those listed as being permitted access, the user is permitted access to the requested resource. The identification system may, for example, use "Caller ID" to obtain the telephone number of the user.

In another embodiment of the present invention, the method is used to control access to e-mail accounts. A service provider creates an e-mail account for a user, and defines special restrictions for accessing the account, for example, that the account may be accessed only when the user is calling from one of a specified set of locations or telephone numbers. When an unidentified user tries to access a mail account, the mail system first queries an identification system for the user's parameters, as described hereinabove. If the parameters match the restrictions, the user may access his e-mail.

In another embodiment of the present invention, the method is used to control access to electronic banking and other financial services. Two examples are electronic trading and electronic bill presentment (a service which allows a user to view and pay for his bills online). A user connects to an online banking service using one of the authentication methods well known in the art, for example, using a password. The online banking service queries an identification service for information about the user.

The identification service evaluates the reliability of the user identification according to predetermined criteria, for example, whether the user is calling from a telephone number registered to the known address of the user. The higher the certainty that the user identification is correct, the higher the level of access to the account granted to the user. For example, the user may be allowed to transfer money between accounts, instead of having read-only access to the account status.

In another embodiment of the present invention, the method is used for enforcing access restrictions on an NAP account (e.g. to limit access of minors to adult content or other controversial material). A user, the NAP, or any other entity asks the NAP to define certain access restrictions on a user's account. The NAP configures the network to relay all communications through a proxy server.

When a user requests a content item, the proxy (which relays all requests) queries an identification service for the identification information of the user. The proxy compares the restrictions on the account with the item requested. The proxy provides or denies access to the content (or requires a previously defined access password).

Figure 2:
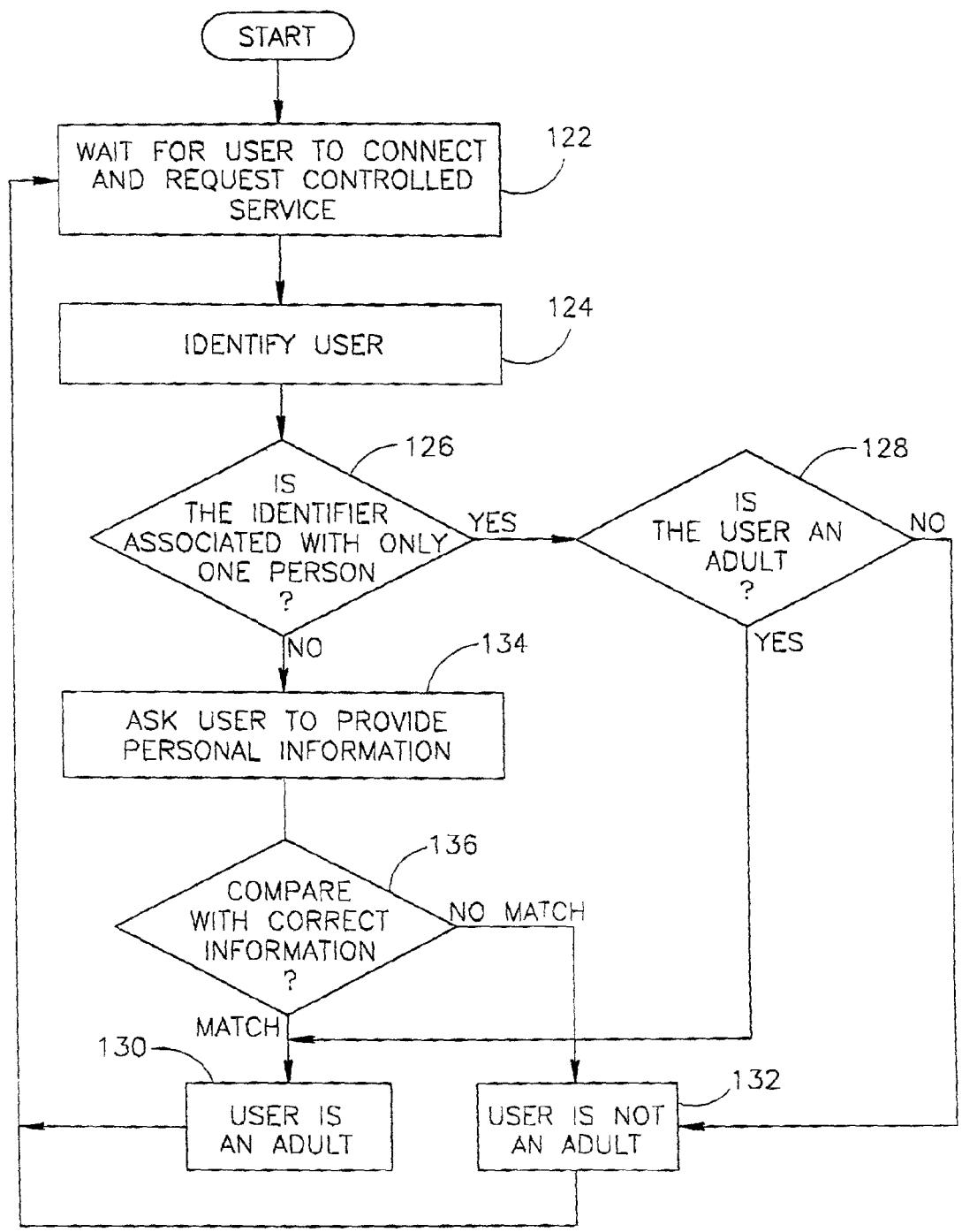
FIG. 2 is a schematic flow chart illustration of a method for verifying that an anonymous network user is an adult, operative in accordance with an embodiment of the present invention.

Reference is now made to FIG. 2, a schematic flow chart diagram for verifying that an anonymous network user is an adult, in accordance with an embodiment of the present invention. Many anonymous network services need to verify the age of a user before allowing access to certain services. This may be done to comply with a law, such as the U.S. Children's Online Privacy Protection Act (COPPA), which prevents Internet sites from collecting information from users under the age of 13 without the consent of a parent.

Since the Internet is primarily an anonymous medium, there is no practical way to distinguish between child and adult users, and, therefore, many sites cannot provide certain services without violating the law. Some of the methods used today to verify a user's age are (1) phone conversations with the parent, (2) signed documents that are mailed or faxed; (3) digital signatures; and (4) a validated credit card transaction.

Methods 1 and 2 are extremely cumbersome. Method 3 requires widespread adoption of secure digital signature technology. Furthermore, users do not necessarily know how to use digital signatures securely. For example, the private key of the user is often unprotected on a desktop computer. The credit card method is also unpractical, since (a) in order to verify the credit card information, a transaction must be completed, and charging a large fee may be unacceptable to users, while a small fee may be unacceptable to credit card companies; (b) users are reluctant to submit this information; and (c) children can easily obtain details of cards.

FIG. 2 describes a secure method for identifying adults. The system first waits for a user to connect and request a service that is restricted to adults (step 122). Once a user connects, he is identified in accordance with an identification method, for example that described in U.S. Patent Application "Automatic Network User Identification" (step 124). If the identifier is associated with only one person (step 126), the system checks if it is an adult (step 128) and reports accordingly (step 130 and step 132). If the identifier describes a group of individuals (such as a phone line or NAP account used by a family), the user is requested to enter a "secret" comprising information that is generally known only to adults and is already known to the NAP or other participating entity (e.g. last 4 digits of the card number of the specific card used to pay the NAP for access) (step 134). If the provided information matches (step 136), the user is considered an adult (step 130), and if it does not match, the user is not considered an adult (step 132). After providing the response, the system waits for the next user request (step 122).

The method of FIG. 2 has the advantage that the process is simple and inexpensive, since verification is done online without lengthy procedures. It also has the advantage of strong verification, as the user must prove knowledge of his personal information or a "secret". For example, the user may be asked to provide details of the credit card he actually uses to pay his NAP, not just any valid card. Another exemplary secret is something appearing on the monthly statement, such as the customer account number.

Figure 3:
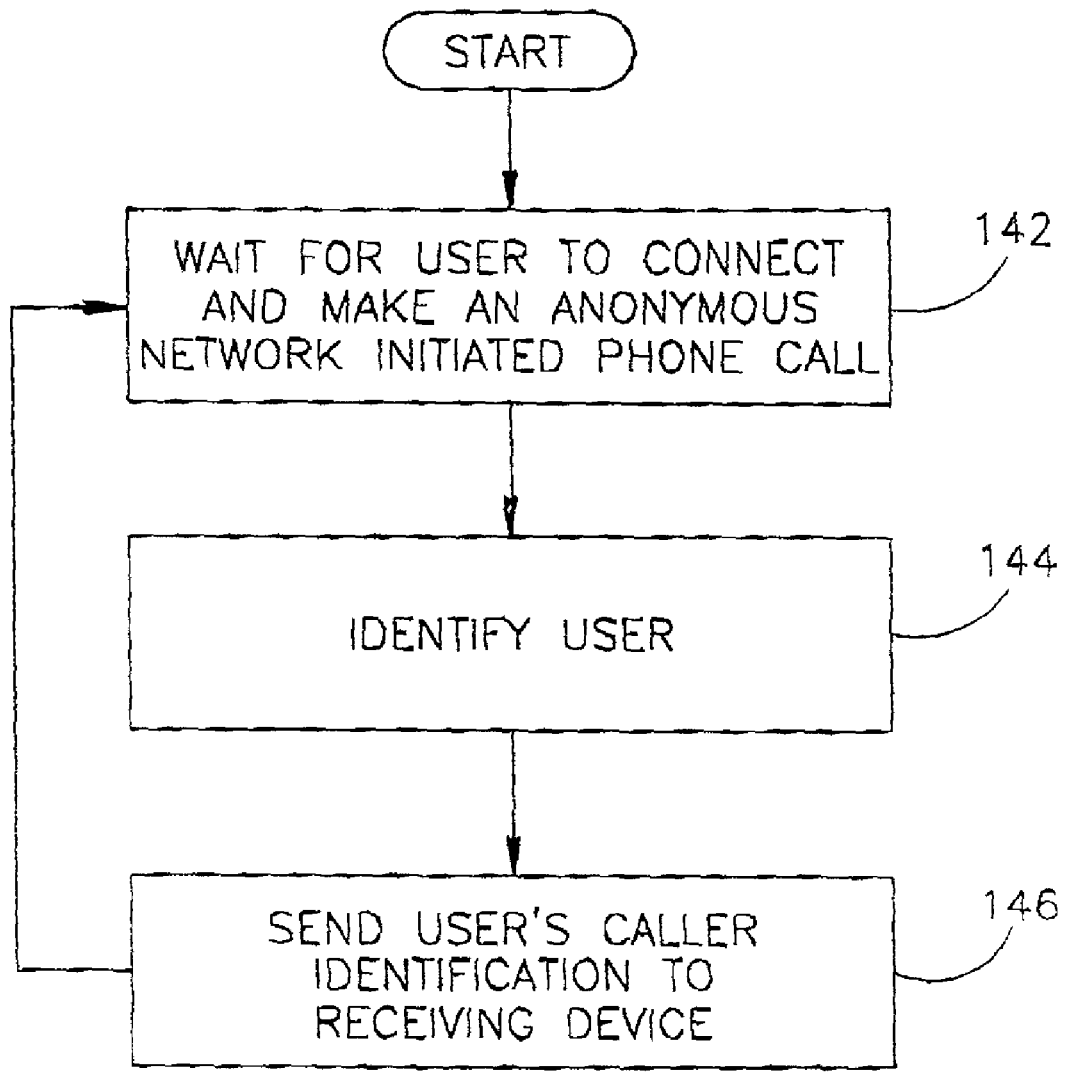
FIG. 3 is a schematic flow chart illustration of a method for providing caller identification on phone calls initiated from an anonymous network, operative in accordance with an embodiment of the present invention.

Reference is now made to FIG. 3, a schematic flow chart diagram of a method for providing caller identification, possibly a phone number, for phone calls initiated from an anonymous network such as the Internet, operative in accordance with an embodiment of the present invention Many people use computer software and an Internet connection to initiate Voice-over-IP telephone calls. These calls may be terminated (received) by Internet phone software or by a standard phone connected to the PSTN (Public Switched Telephone Network). In the latter case, a gateway must relay the call from the Internet to the PSTN. As the call does not originate within the PSTN, the receiving side may not see the caller identification of the calling party automatically. In such a case, it is necessary to identify the caller by an identification method, for example that described in U.S. Patent Application "Automatic Network User Identification".

The system first waits for a user to connect and make a call from an anonymous network (step 142). The user is then identified (step 144), and his caller identification is sent to the receiving device (step 146). The reported caller identification is the same caller identification the NAP received when the user established the phone connection to the NAP. An example of a caller identification is the area code and telephone number of the phone line from which the call was made. Naturally, if the user is not connected over the phone infrastructure, or if his caller identification was not reported, it will not be forwarded. Examples are a phone call executed via a point-to-point connection or use of a system such as Caller ID blocking.

Figure 4:
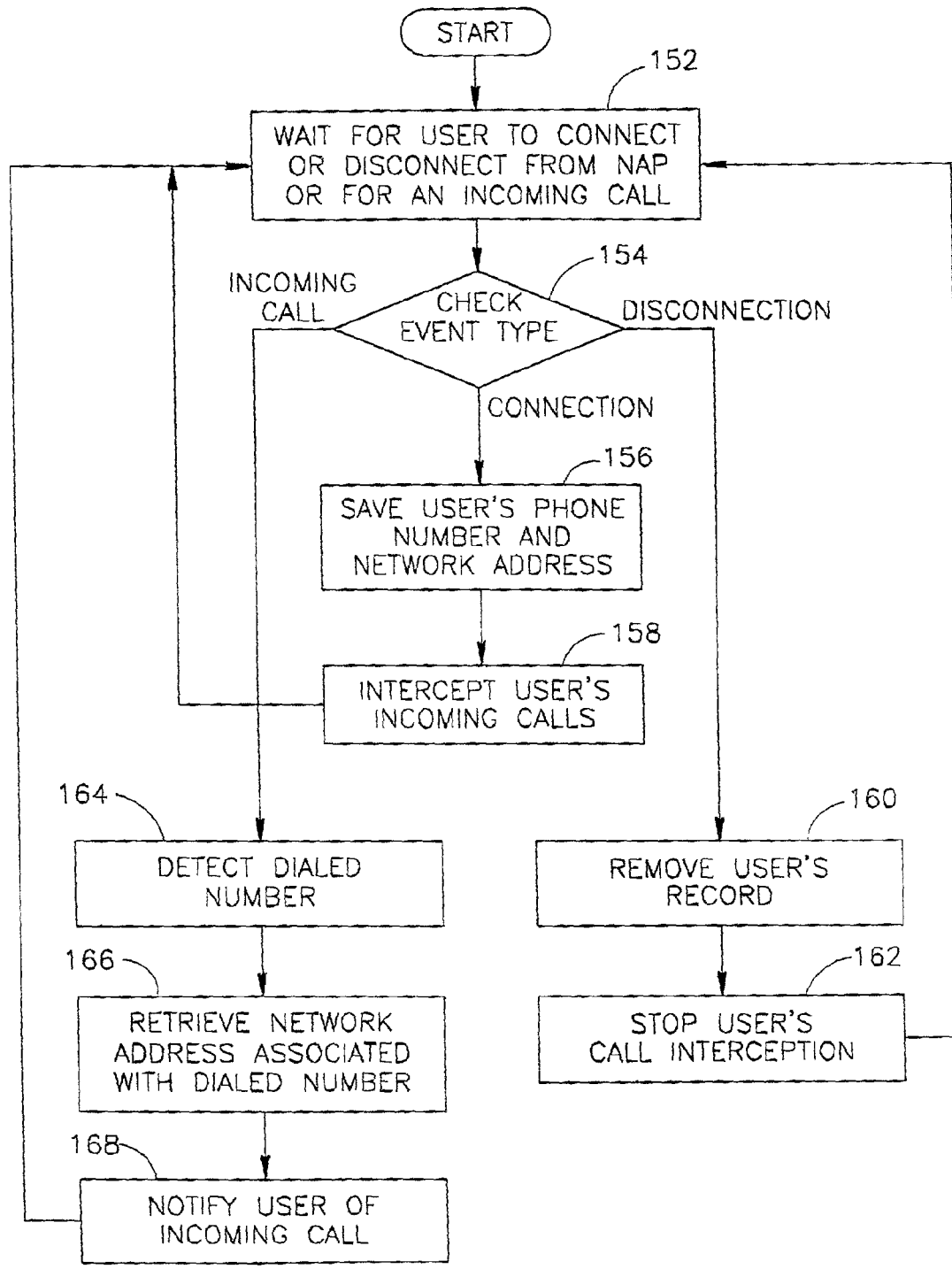
FIG. 4 is a schematic flow chart illustration of a call management system handling incoming calls on a phone line connected to an anonymous network, operative in accordance with an embodiment of the present invention.

Reference is now made to FIG. 4, a schematic flow chart diagram of a call management system for handling incoming calls on a phone line connected to an anonymous network. Many people subscribe to a "Call Waiting" service from their telephone service providers. Generally, when the telephone line is in use, a special tone is sent to inform the telephone user that another telephone connection is being attempted. However, when the phone line is connected to an anonymous network, the notification is generally not received by the user. In some cases, this notification may interfere with the modem connection to the anonymous network.

Several systems have been developed to offer "Internet Call Waiting" services, which allow users to handle Call Waiting when they are online. Some of these systems are operated by phone companies and reroute incoming calls to a server that notifies a user of a waiting call. Examples of such systems are Internet Call Waiting of Comverse Technology, Inc., Woodbury, N.Y. and Internet Call Waiting of Nortel Networks Corporation, Ontario, Canada.

These systems require users to install client software. This client connects to the Internet Call Waiting server and notifies it that the user is now connected to the Internet. The server then notifies the telephone switches to reroute all the user's incoming calls to the Call Waiting server. When a call is received at the server, the client is notified of the call, and the user receives a message online allowing him to decline the call, send it to his voice mail, forward it to another number, accept it with a Voice-over-Internet client, play a message, etc.

FIG. 4 is a flow chart diagram of a call management system, constructed and operative in accordance with an embodiment of the present invention, which does not require users to install a client. First the call management system waits for notification from an identification system, for example that described in U.S. Patent Application "Automatic Network User Identification", that a user is connecting or disconnecting from the NAP or of an incoming call (step 152) and checks the event type (step 154). If a user is connecting, his phone number as reported in the caller identification to his NAP and his network address are associated and saved (step 156), and any calls to this number are then intercepted and rerouted to the call management system (step 158). This step may require the cooperation of the telephone network service provider and integration into its systems. The call management system then waits for further events (step 152).

If the reported event in step 154 is a user disconnecting from his NAP, the record of his phone number and network address association is removed (step 160), call rerouting and interception are stopped (step 162), and all calls are then routed directly to the user's line The call management system then waits for further events (step 152).

When an incoming call is detected, the server determines the call's intended destination (i.e. the actual number dialed) (step 164). This may be reported, for example, by the dialed number identification service (DNIS) of the telephone infrastructure (step 164). The server then finds the network address associated with the phone number (step 166) and notifies the user of the call (step 168). The step of notifying the user of the call may be done using any appropriate method, for example an instant messaging client installed on the user's machine (e.g. ICQ or AOL Instant Messenger of AOL Time Warner, New-York, N.Y.), Voice-over-Internet clients, proprietary software or NAP-based messaging systems (e.g. the iNotes system developed by Web, New-York, N.Y.), or any other method that can contact the user based on his network address.

In the method of FIG. 4, the user may receive the service without installing a client. The system can associate the network address with the phone number by using an appropriate identification system such as that described in U.S. Patent Application "Automatic Network User Identification". Furthermore, the user may be contacted by alternative methods as appropriate for him. The method increases security by having the user's phone number reported by the phone infrastructure, not by software running on the user's computer, thus preventing theft of phone calls by assuring that phone calls are routed to the correct user. Still further, the method offers flexibility, since it automatically handles calls for whichever phone line is currently being used by the user.

Figure 5:
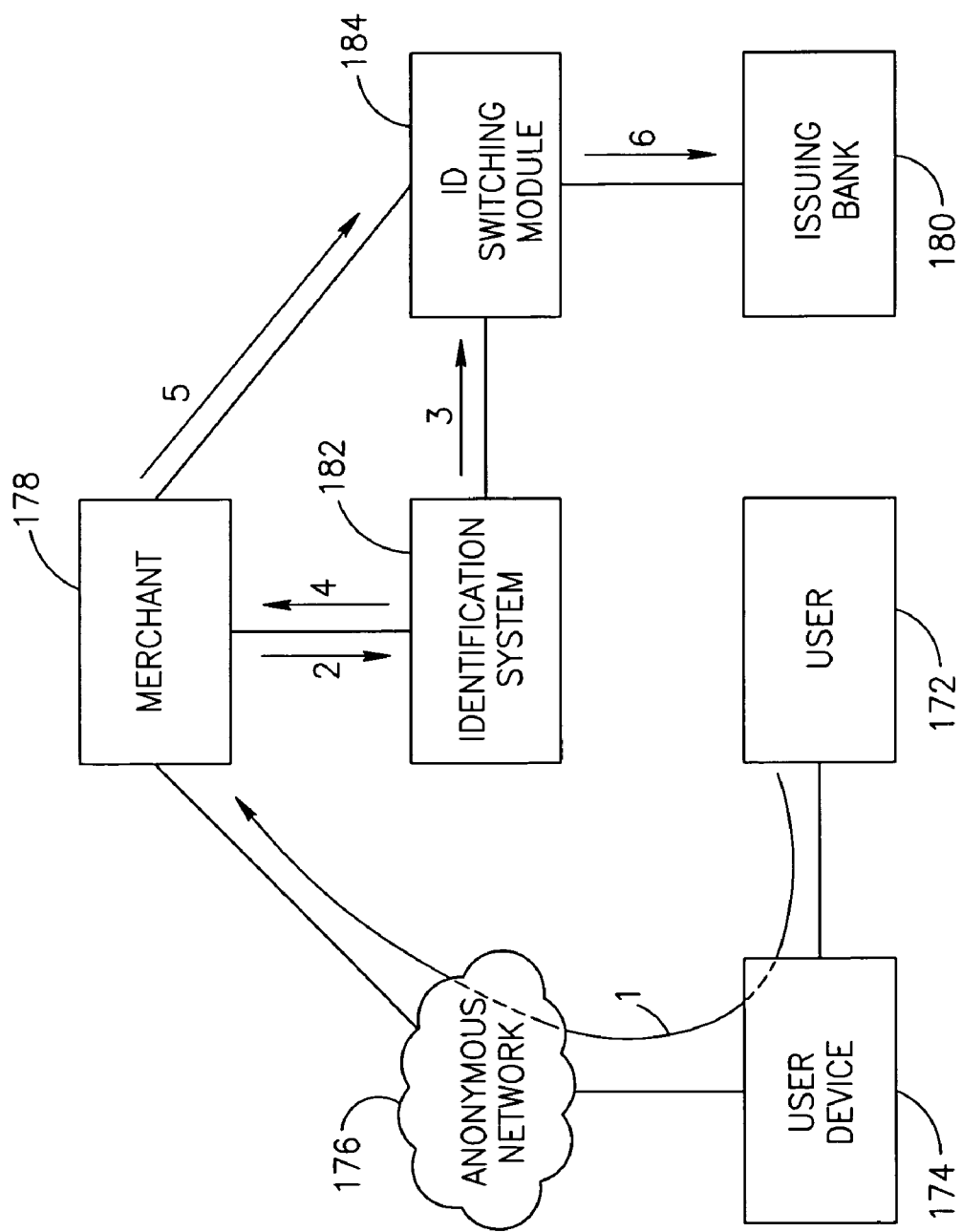
FIG. 5 is a schematic block diagram of a system for carrying out a method for conducting credit card transactions over an insecure network, constructed and operative in accordance with an embodiment of the present invention.
Figure 7:
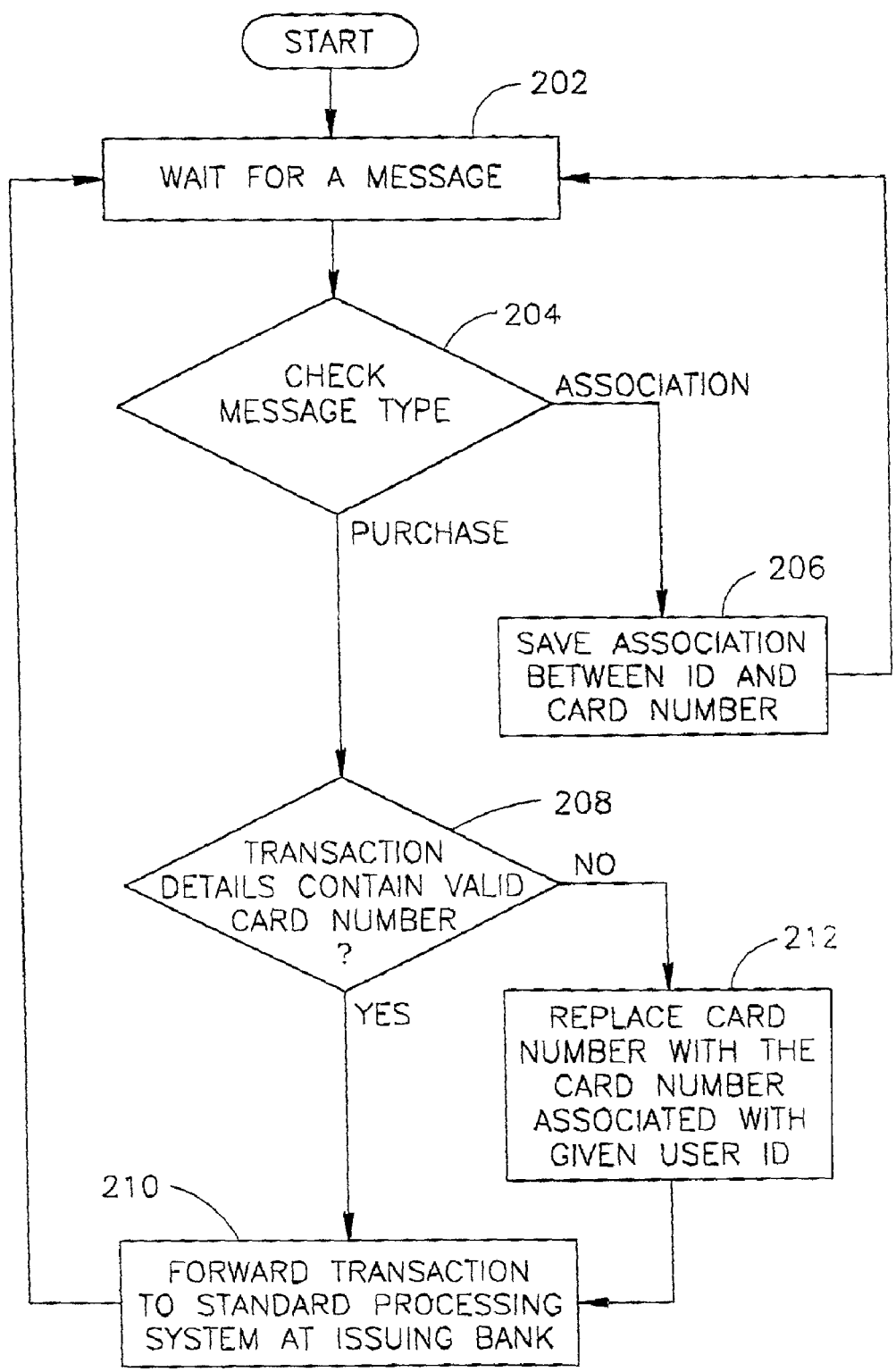
FIG. 7 is a schematic flow chart illustration of the steps performed by the ID switching module of FIG. 5, operative in accordance with an embodiment of the present invention.

Reference is now made to FIGS. 5, 6, and 7. These figures describe credit card transactions for exemplary purposes only, and their content may be applied to any chargeable account, such as debit cards and checking accounts.

FIG. 5 is a schematic block diagram of a system for managing an account for a user over an insecure network for example for conducting credit card transactions over an anonymous network, constructed and operative in accordance with an embodiment of the present invention. Currently the most common form of payment for goods and services in Internet shopping is credit cards. Credit card transactions on the Internet are complex, inconvenient and susceptible to fraud. Many potential customers do not want to give their credit card numbers to Internet merchants, even when a secure connection is available, because Internet merchants maintain a database of credit card numbers on a machine that is connected to the Internet, and malicious hackers might be able to steal credit card numbers from this database.

Many payment methods have been offered to overcome this problem. One of them is the secure electronic transaction (SET) project, (described on the Internet at http://www.visa.com/set), which requires a customer to register at a bank and install software on his computer in order to be able to perform credit card transactions on an insecure network. PCT International Publication No. 00/49586 to Flitcroft et al. describes a payment method usually termed "disposable credit cards", such as Private Payments offered by American Express, New York, N.Y. and developed by several companies, including SecureClick of Cyota Inc., New York, N.Y., O-card of Orbiscom, Dublin, Ireland and others. These systems require installation on the customer's computer of software that sends temporary credit card numbers generated by the user's credit card issuer to Internet merchants.

The account management system described in FIG. 5 is based on an identification system that does not require software installation on the customer's computer, for example the identification system described in U.S. Patent Application "Automatic Network User Identification". The system of the invention comprises identification system 182 and ID switching module 184.

A user 172 is connected to an anonymous network 176 using a user device 174, which may be a personal computer with a modem, a cellular phone with to anonymous network capabilities, or any device suitable for connecting to an anonymous network. User 172 has a credit card issued to him by an issuing bank 180. A merchant 178 is connected to anonymous network 176, where he offers goods or services for sale, using a World Wide Web site or any other suitable method for offering and selling goods over anonymous network 176.

Merchant 178 is connected to identification system 182. Merchant 178 is also connected to issuing bank 180 for the purpose of charging the bank's customers for credit card transactions conducted at his site. Usually, merchant 178 is not directly connected to the issuing bank 180 but, rather, is connected to his own bank, called the "acquiring bank", which is connected to the issuing bank 180, or to 20 a credit card processing service that connects merchants to the bank networks used by credit card companies (also called the "interchange network"). A description of the interchange network protocols is given in International Standard ISO 8583.

ID Switching Module 184 is located in the interchange network between merchant 178 and issuing bank 180 and is responsible for managing associations between identifiers given to users 172 by identification system 182 and users'0 card numbers, as described in detail hereinbelow. Various embodiments of the present invention place ID switching module 184 in various locations between merchant 178 and issuing bank 180. It may be placed at issuing bank 180, at the acquiring bank of merchant 178, or elsewhere on the interchange network. It may also be located at a transaction processor that handles transactions for acquiring or issuing banks. Examples of such processors include First Data Merchant Services and First Data Resources of Atlanta, Ga., and Paymentech of Dallas, Tex. The module may also be located at an "Internet payment gateway", a company that provides connectivity between the Internet and card processors. Examples of such companies are Verisign of Mountain View, Calif. and Cybersource of Mountain View Calif.

The connections between merchant 178 and identification system 182 and between identification system 182 and ID switching module 184 should be secure. These may be leased data lines, encrypted channels over the Internet or other network, or any other secure communication method.

FIG. 6 is a tabular illustration of the requirements of a system that manages a user account over an insecure network, for example by carrying out conducting credit card transactions over an insecure network. Stages in column 1 refer to arrows in FIG. 5.

A transaction is initiated by a request from user 172 to merchant 178 by means of anonymous network 176 (arrow 1). Merchant 178 then requests identification system 182 to identify user 172 (arrow 2). This request is made over a secure connection. Identification system 182 automatically identifies the user, for example in accordance with the identification method of U.S. patent application "Automatic Network User Identification". Identification system 182 will find appropriate identification information, for example the user's credit card account number. The identification information may be obtained from any database that can associate a user ID obtained by identification system 182 with identification information usable by a billing system. For example, the NAP of the user usually has a billing database used to charge its customers for access. This database will normally associate the username of the user (as authenticated each session) with his billing details.

Identification system 182 then sends the user ID and identification information to ID switching module 184 (arrow 3), and the user ID to merchant 178 (arrow 4). Both of these are also sent over a secure connection. Merchant 178 then processes the transaction using his standard payment processing methods, with the exception that the user ID replaces the identification information. The transaction first goes to ID switching module 184 (arrow 5), which may be placed between merchant 178 and issuing bank 180 on the interchange network. ID switching module 184 replaces the user ID with the identification information of the user, as described in detail hereinbelow with respect to FIG. 7, and forwards the transaction over the Interchange network to the issuing bank's processing system, where it is handled like a standard payment transaction (arrow 6).

As mentioned hereinabove, identification system 182 sends a user ID to merchant 178 and ID switching module 184. This user ID may be an actual identifier of a user, a meaningless unique ID, or even a temporary ID. Using a temporary ID has the advantage of the disposable credit card systems described hereinabove, wherein confidential identifiers are not exposed to merchant 178 For example, if another merchant 178 tries to charge a user 172 using the same ID, the transaction is detected as fraudulent, since the ID was not assigned to that merchant 178, was already used, has expired, or because some other limitation has been violated.

Merchant 178 may send the user ID over the interchange network with the transaction (arrow 5). This may be done, for example, by having the user ID formatted into a credit card number that the merchant charges. In this case, the credit card number must begin with the issuing bank's 6-digit Bank Identification Number (BIN, as described in ISO 7812), which identifies the bank in the interchange network, in order for the transaction to be routed to issuing bank 180 of the user. Alternatively, the user ID may be sent in another available field in the interchange protocol (as described in ISO 8583). In this case, a "fake" credit card number is generated, one that begins with the bank's BIN, and merchant 178 charges this card for the transaction by routing to issuing bank 180.

Identification system 182 sends (arrow 3) the association between the user ID and the identification information over a secure connection. One method of making this communication secure is by utilizing the existing connection of the NAP to the interchange network, taking into account that the NAP is an essential participant in identification system 182. Because NAPs have means to charge their customers, for example, using credit cards, they also have access to appropriate payment processing mechanisms. An NAP that has an NAP identification module similar to that described in U.S. patent application "Automatic Network User Identification", may use this connection to send the message depicted by arrow 3. For example, the NAP will send an authorization transaction with the user's identification information and add the user ID in another field, such as an AVS (Address Verification Service) field. This method may not work if ID switching module 184 is located at the acquiring bank, Merchant card processor or Internet Payment Gateway, since the NAP and merchant 178 may process their card transactions through different institutes, and the association transaction and purchase transactions may not be matched. In such case, it may be necessary to install several ID switching modules 184 and have them share information.

Another alternative for the step indicated by arrow 3 is to send the association information beforehand, not in real time. For example, the NAP may send the associations of user IDs with the identification information of all its customers once and then update it periodically. In this case, ID switching module 184 may already have the necessary association information, and would not need to be informed in real time. Specifically, this may be done during the standard billing cycle of the NAP allowing the NAP to add the user ID information to each transaction processed.

In another embodiment, the step of submitting the transaction is done through identification system 182. Merchant 178 submits the transaction details to identification system 182, which forwards them to issuing bank 180. To provide this service, identification system 182 needs to be connected to the interchange network, for example, by being connected to an acquiring bank. The system may also use the existing connection between participating NAPs and their banks or processors. If the transaction is submitted from the user's NAP, this configuration has the advantage that user details are not exposed to any party other than the NAP and banks.

If user IDs are sent in advance, it will no longer be possible to assign temporary IDs as described above, since ID switching module 184 will not be updated in real time about the new temporary IDs assigned. This may be overcome by assigning temporary IDs and updating ID switching module 184 regarding the association between the temporary ID and the user ID already reported to ID switching module 184. This may be beneficial if card numbers are not sent on the direct channel between identification system 182 and ID switching module 184.

Referring back to FIG. 7, a schematic flow chart diagram of the steps performed by the ID switching module 184 of FIG. 5 is shown, which is operative in accordance with an embodiment of the present invention. ID switching module 184 waits for messages to arrive (step 202). When a message arrives, its type is checked (step 204). If the message is an association message, as described hereinabove with respect to arrow 3, the association between the user ID and credit card number is saved (step 206), and the module waits for further messages (step 202). If the message is a purchase, the credit card number is checked for validity (step 208). If it is valid, no further processing need be done by ID switching module 184, and the transaction details are passed directly to the standard processing system (step 210). If the card is not valid, the transaction requires further processing wherein the credit card number associated with the given user ID is retrieved and placed in the transaction details (step 212). The transaction is then processed in accordance with standard processing methods (step 210), and the system waits for further messages (step 202).

In accordance with another embodiment, ID switching module 184 does not process all transactions, and only transactions that use the automatic identification method are sent to it.

In accordance with yet another embodiment, there is no direct integration of the account management system with the site of merchant 178; the system can work without requiring merchants 178 to make any changes or installations. In this case, merchant 178 receives the required details formatted in accordance with his current mode of operation and in a way that will allow his current processing methods to charge the user.

For example, in the case of a typical Internet merchant collecting billing details by way of an HTML form on his web site, the system will automatically fill in the details on the form. These details will include the user ID and issuing bank BIN, which is formatted within the credit card account number. Other fields may also be used, such as the billing address of the customer, used for AVS.

In order to automatically fill in the form, the system needs to become aware that a user is currently accessing a merchant site and then invoke the identification process. This may be done by having all user communications pass through a fitter that detects purchase forms and automatically fills them in. Alternatively, the user may actively provide the URL of a purchase form at a merchant site on which he wishes to use the proposed payment method.

These embodiments shown hereinabove are exemplary of the alternatives possible when using the account management system of the present invention. The possible embodiments may be used in any combination and thus provide a suite of services positioned to answer various requirements of the Internet Commerce market.

It should be noted that, while using the technology of U.S. patent application "Automatic Network User Identification" gives the system some strong advantages, the applications described can be implemented using any identification method. For example, the customer may be required to enter his NAP username and password manually during the transaction, to use a smart card, biometrics etc. The system is unique in that NAPs, which already have the confidential billing information of the customer, send it over a secure connection directly to the interchange network rather than having the customer send it over an insecure network to a merchant.

It will be appreciated that although the description of the account management system uses credit card transactions as examples, it may be applied to any chargeable account, such as debit cards and checking accounts.

It should also be noted that although the description of the account management system uses transactions occurring over the Internet as examples it may be applied to any data network, such as a cellular or mobile data network servicing users accessing with data enabled telephones.

Figure 8:
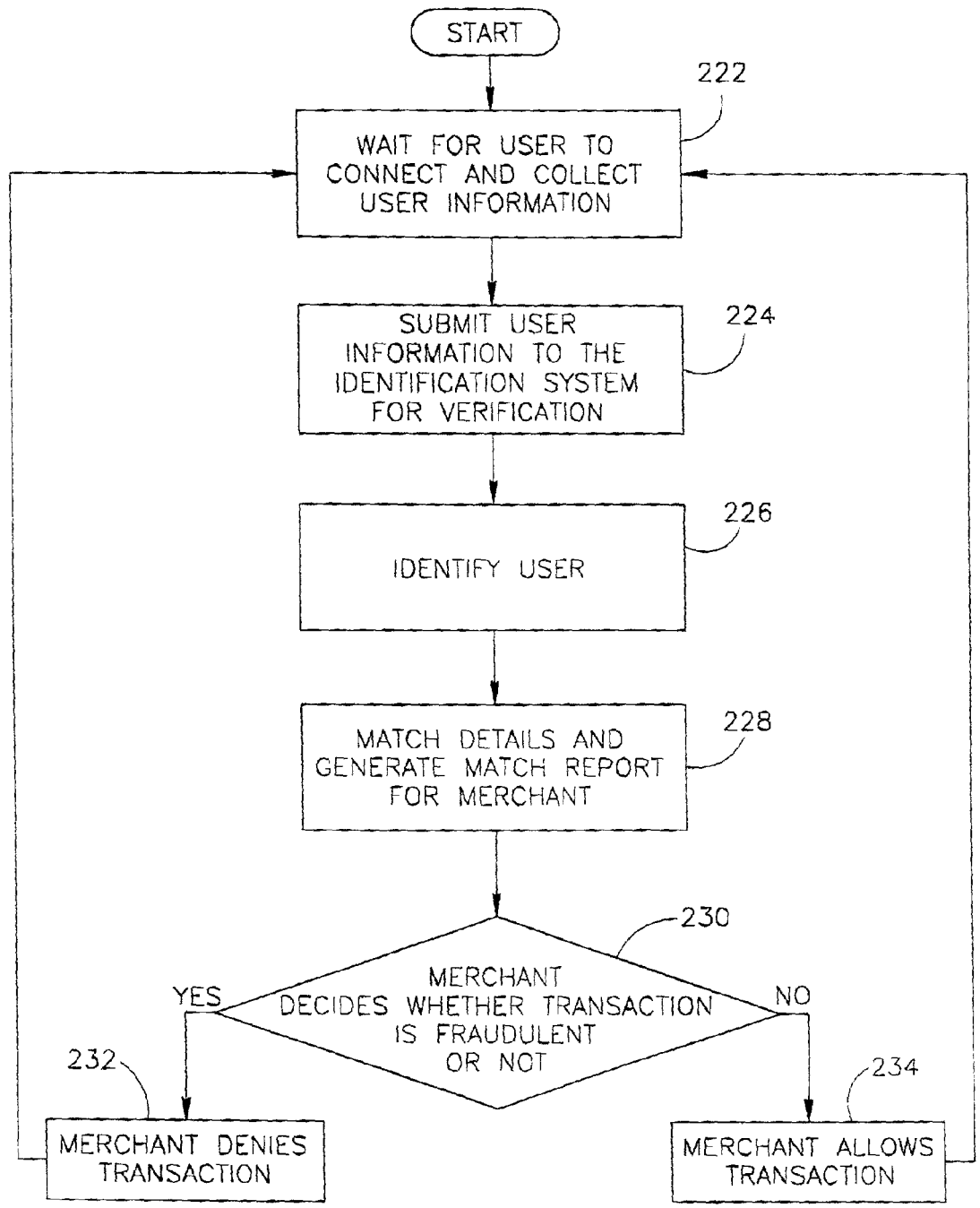
FIG. 8 is a schematic flow chart illustration of a fraud prevention system, operative in accordance with an embodiment of the present invention.

Reference is now made to FIG. 8, which is a schematic flow chart illustration of a fraud prevention system, operative in accordance with an embodiment of the present invention. In cases in which the user provides his billing details manually, such as when filling in an online credit card form, it may be beneficial to verify the user's identity and thereby reduce the possibility of fraud.

Several methods exist today for achieving this objective. One popular method is AVS, in which the user is asked to provide the address to which his card statement is sent. Although this does provide some very limited protection from fraud, it significantly complicates online transactions.

In the system described in FIG. 8, an online merchant collects relevant user information (step 222), and submits it to the identification system for verification (step 224). The user is then identified in accordance with the identification method described in U.S. patent application "Automatic Network User Identification" (step 226) or any other appropriate identification method. The extracted identification details of the user are matched against the manually provided details, and a match report is provided to the merchant (step 228). The merchant then decides whether or not the transaction is fraudulent (step 230), denies or allows the transaction (steps 232, 234), and waits for the next user to provide information (step 222).

It will be appreciated by persons skilled in the art that the present invention is not limited by what has been particularly shown and described hereinabove. Rather the scope of the invention is defined by the claims that follow:

What is claimed is:

1. A method of controlling access of a user to a service, the method comprising:
   obtaining a first, transient identifier associated with a communication session of said user over an anonymous network;
   obtaining a second identifier associated with persistent real-world information of said user from a network access provider (NAP) through which said user is connected to said service, said second identifier associated with said first identifier at said NAP; and
   controlling access based on said second identifier.

2. A method according to claim 1, wherein said service is selected from the group consisting of e-mail service, electronic banking, financial service, and firewall.

3. A method according to claim 1, wherein said network is selected from the group consisting of an Internet network, a wireless data network, a cellular data network, and a CATV-based data network.

4. A method according to claim 1, further comprising:
   evaluating the reliability of said second identifier based on predetermined criteria; and
   determining the level of access to provide to said user based on said reliability.

5. A method for providing a telephone call identifier, the method comprising:
   obtaining by a network device an identifier associated with a telephone line accessing a data network; and
   sending said identifier to be associated with a telephone call to a terminating telephone network.

6. A method for verifying that an anonymous network user is an adult, the method comprising:
   obtaining by a network device account details associated with said user; and
   reporting said user as an adult if said account details pertain only to users above a predetermined age.

7. A method according to claim 6, wherein said step of obtaining comprises receiving said account details from a network access provider servicing said user.

8. A method according to claim 6, wherein said account details pertain to at least one user below said predetermined age and further comprising:
- obtaining information associated with said account generally known only to adult users of said account;
- requesting said user to enter an at least generally significant part of said information; and
- reporting said user as an adult if said at least generally significant part matches the corresponding part of said information.

9. A method for handling telephone calls during a dial-up Internet connection, the method comprising:
- obtaining an identifier of a telephone line connecting a user to a data network from a network side of a connection between said user and said data network;
- associating said identifier with information for contacting said user over said network; and
- configuring incoming telephone calls to said user according to said information.

10. A method according to claim 9, further comprising: upon receiving said incoming call, sending notification of said incoming call to said user.

11. A method according to claim 9, further comprising at least one of:
- forwarding said incoming call to said user over said network;
- forwarding said incoming call to said user over a telephone network;
- sending to said user information about the origin of said incoming call; and
- receiving from said user at least one order about how to handle said incoming call.

12. A system for handling telephone calls, the system comprising:
- an extraction unit able to extract an identifier of a telephone line connecting a user to a data network from a network side of a connection between said user and said network;
- an association unit able to associate said identifier with information for contacting a user associated with said telephone line over said network; and
- a messenger system communicating with said user over said network using said information for contacting said user.

13. A method according to claim 1 for verifying the authenticity of information provided by a user in a communication session over an anonymous network, the method comprising the steps of:
- obtaining account details previously collected by said NAP and associated with said user by said NAP; and
- determining the authenticity of said information by comparing said information with said previously verified account details.

14. A method according to claim 1 verifying the authenticity of information provided by a user, the method comprising:
- sending by a service provider to a network access provider (NAP) through which said user is engaged in a communication session with said service provider a request to identify said user, said request including said information and an identifier of said communication session; and
- receiving a report from said NAP comprising the match results between said information and account details previously collected by said NAP and associated with said user by said NAP.

* * * * *